Sept. 23, 1924.   L. W. BUGBEE   1,509,636
FUSED BIFOCAL LENS
Original Filed May 5, 1921
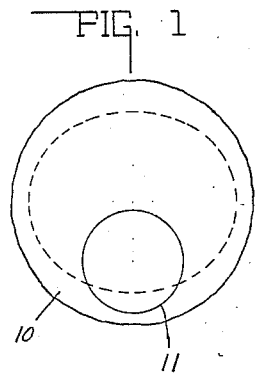
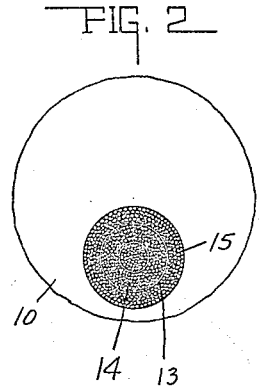
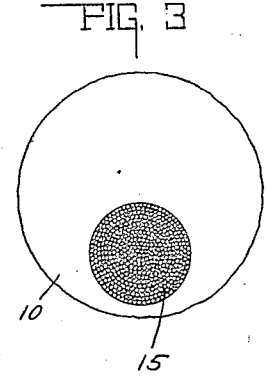
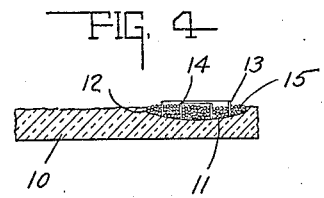
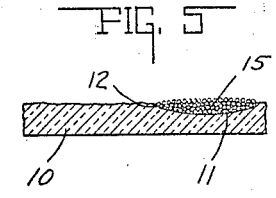
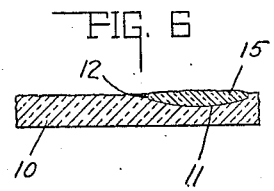
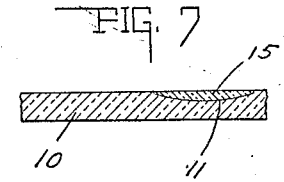
INVENTOR.
LUCIAN W. BUGBEE.
BY
Lockwood & Lockwood
ATTORNEYS.

Patented Sept. 23, 1924.

1,509,636

UNITED STATES PATENT OFFICE.

LUCIAN W. BUGBEE, OF INDIANAPOLIS, INDIANA, ASSIGNOR TO FRANKLIN OPTICAL COMPANY, OF INDIANAPOLIS, INDIANA, A CORPORATION.

FUSED BIFOCAL LENS.

Original application filed May 5, 1921, Serial No. 467,141. Divided and this application filed April 12, 1923. Serial No. 631,531.

*To all whom it may concern:*

Be it known that I, LUCIAN W. BUGBEE, a citizen of the United States, and a resident of Indianapolis, county of Marion, and State of Indiana, have invented a certain new and useful Fused Bifocal Lens; and I do hereby declare that the following is a full, clear, and exact description thereof, reference being had to the accompanying drawings, in which like numerals refer to like parts.

This application is a division from my former application, Serial No. 467,141 on fused bifocal lens and process of making the same, filed May 5, 1921.

The object of this invention is to provide a fused bifocal or kryptok lens in which the reading field varies in character from its center to its circumference with the indices of the minor or reading field graduated, or of gradually increasing power from the margin of the lens to the center.

Another feature of the invention consists in the index of the glass varying so that the lens will have more than two portions of different indices. The graduation of the power of the reading field makes the lens easy to the eye of the user.

The full nature of the invention will be understood from the accompanying drawings and the following description and claims.

In the drawings, Fig. 1 is a plan view of a fused bifocal blank with the outline of the finished lens indicated by a dotted line. Fig. 2 is a plan view of such a blank with the flint glass insert in the recess of the main portion of the lens shown in its position and condition when first placed in said recess. Fig. 3 is the same after the partitions have been removed from the recess. Fig. 4 is a central section of Fig. 2. Fig. 5 is a central section of Fig. 3. Fig. 6 is the same as Fig. 3 after fusing. Fig. 7 shows a lens after it is ground and polished.

The main portion and distance field of the lens 10 is composed of ground glass with the recess 11 therein made in any desired way, but preferably with a shoulder 12 at the margin of said recess. Then there is placed in said recess a plurality of annular or ring-like partition bands 13 and 14 concentric to said recess. As here shown there are two of said rings used which divide the space in said recess into three concentric zones and of substantially the same width.

Then different varieties or qualities of flint glass 15 or glass of a higher index of refraction than the main portion of the lens are made or obtained for the near field. The selection of this flint glass should vary gradually in index of refraction from a relative low index to as high an index as desired. The different qualities of flint glass are separately broken into small particles and each quantity of particles is separately formed in the nodules, preferably by revolving them in a container in which they grind the sharp edges away and leave rounded nodules. Then the dust and small irregular particles are sifted out from among the nodules.

The nodules of the flint glass having the highest index of refraction are placed in the center band or ring and those of the glass having the next lower index of refraction are placed in the middle band or ring, and those of a still lower index are placed in the recess surrounding the outer ring or band. This forms three zones instead of two and the nodules are heaped up to a level higher than the main body of the lens, as shown in Fig. 4.

The next step in the process is to remove the ring or bands, which, by the way, are made of metal or any suitable material, and that leaves a mass of nodules substantially as shown in Figs. 3 and 5. The same then is subjected to sufficient heat to fuse the nodules of flint glass together and fill the recess and secure the same to the crown glass portion of the lens, as shown in Fig. 6. In the fusing the adjacent rings of flint glass merge together so as to make a solid structure of glass without any division between the glass in the formed rings of nodules, as seen in Fig. 6. After that the lens is ground and polished, as shown in Fig. 7. While plano blanks are shown in the drawings, the invention is not limited to any particular form of lens.

It is thus seen that in this lens the reading field 15 is of gradually increasing power from its margin to its center and that it has concentric zones differing in their indices of refraction, but merging into each other.

The invention claimed is:

1. A lens for eyeglasses and spectacles having a distance field of uniform power, and a near-vision field of gradually increasing power from its line of juncture with the distance field.

2. A lens for eyeglasses and spectacles having even surfaces and having a distance field of uniform power and near-vision field of varying power which graduallly increases in strength from its line of juncture with the distance field.

3. A fused bifocal lens including a main portion for distance vision and a reading segment formed of glass fused with said main portion and arranged in concentric zones differing in their indices of refraction.

4. A fused bifocal lens including a main portion for distance vision and a reading segment formed of glass fused with said main portion and arranged in concentric zones differing in their indices of refraction, the indices of said zones diminishing from their center to the main portion of the lens.

In witness whereof, I have hereunto affixed my signature.

LUCIAN W. BUGBEE.